United States Patent
King et al.

(10) Patent No.: US 10,857,427 B2
(45) Date of Patent: Dec. 8, 2020

(54) HARD-POINT FIXTURE AND SYSTEM FOR ATTACHING THE FIXTURE TO A TARGET SURFACE

(71) Applicant: The Charles Stark Draper Laboratory, Inc., Cambridge, MA (US)

(72) Inventors: Daniel King, Watertown, MA (US); Isaac Ehrenberg, Brookline, MA (US); Alexander Sawyer, Seekonk, MA (US); Graham Arrick, Cambridge, MA (US); Juliette E. Mahaffey, Boston, MA (US); William McFarland, Waltham, MA (US); David Carter, Concord, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 172 days.

(21) Appl. No.: 15/986,144

(22) Filed: May 22, 2018

(65) Prior Publication Data

US 2019/0015704 A1    Jan. 17, 2019

Related U.S. Application Data

(60) Provisional application No. 62/510,165, filed on May 23, 2017, provisional application No. 62/537,211, filed on Jul. 26, 2017.

(51) Int. Cl.
| | |
|---|---|
| *B29C 65/08* | (2006.01) |
| *A63B 29/08* | (2006.01) |
| *B29C 35/08* | (2006.01) |
| *A63B 1/00* | (2006.01) |
| *B29C 35/02* | (2006.01) |

(52) U.S. Cl.
CPC ............. *A63B 29/08* (2013.01); *A63B 1/00* (2013.01); *B29C 35/0805* (2013.01); *B29C 2035/0211* (2013.01); *B29C 2035/0822* (2013.01); *B29C 2035/0827* (2013.01)

(58) Field of Classification Search
CPC ........ B29C 35/0805; A63B 1/00; A63B 29/08
See application file for complete search history.

(56) References Cited

U.S. PATENT DOCUMENTS 3,719,792 A * 3/1973 Cuccaro ................. B25B 31/00
219/230
4,250,596 A * 2/1981 Hara ...................... B29C 65/54
156/278

(Continued)

OTHER PUBLICATIONS

International Search Report and Written Opinion from related PCT Application No. PCT/US18/33864, dated Sep. 21, 2018.

*Primary Examiner* — Daniel McNally
(74) *Attorney, Agent, or Firm* — Burns & Levinson, LLP; Joseph M. Maraia

(57) ABSTRACT

A hard-point fixture placement system places a fixture that is pre-loaded with a curable adhesive by mechanically extruding the adhesive between the fixture and a target surface to which the fixture is to be attached. The placement system includes an irradiating device to cure the adhesive. The hard-point fixture stores the adhesive in a reservoir that is protected from the curing radiation. Once the curing process is complete, the fixture is released from the placement system leaving the fixture affixed to the target surface.

22 Claims, 20 Drawing Sheets

(56) References Cited

U.S. PATENT DOCUMENTS

| | | | | |
|---|---|---|---|---|
| 5,044,852 A | * | 9/1991 | Sweeney | F16B 13/143 |
| | | | | 248/205.3 |
| 5,277,530 A | * | 1/1994 | Sweeney, Sr. | B29C 65/54 |
| | | | | 411/258 |
| 7,335,325 B1 | | 2/2008 | Pierson | |
| 2002/0092601 A1 | * | 7/2002 | Sweeney, Jr. | B60J 1/005 |
| | | | | 156/108 |
| 2004/0238111 A1 | * | 12/2004 | Siegel | B41F 23/0409 |
| | | | | 156/275.5 |
| 2008/0015090 A1 | | 1/2008 | Brewer | |
| 2008/0257615 A1 | | 10/2008 | Xie et al. | |
| 2011/0217482 A1 | * | 9/2011 | Thomas | B29C 73/02 |
| | | | | 427/558 |

* cited by examiner

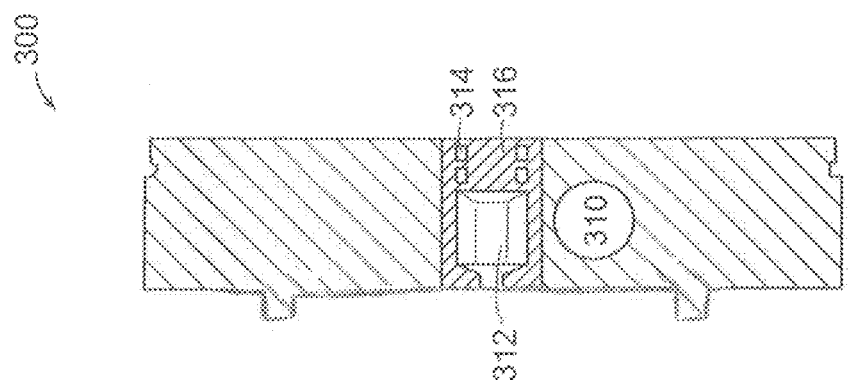
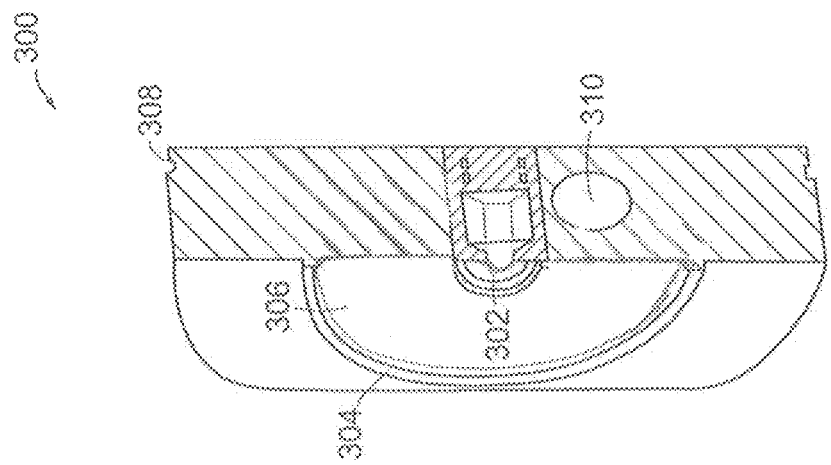
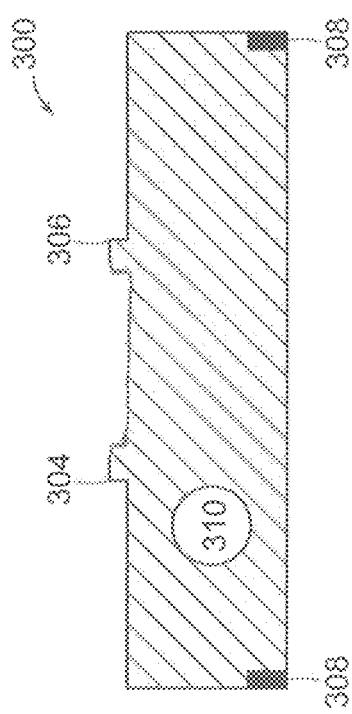
FIG. 3D
FIG. 3C
FIG. 3B

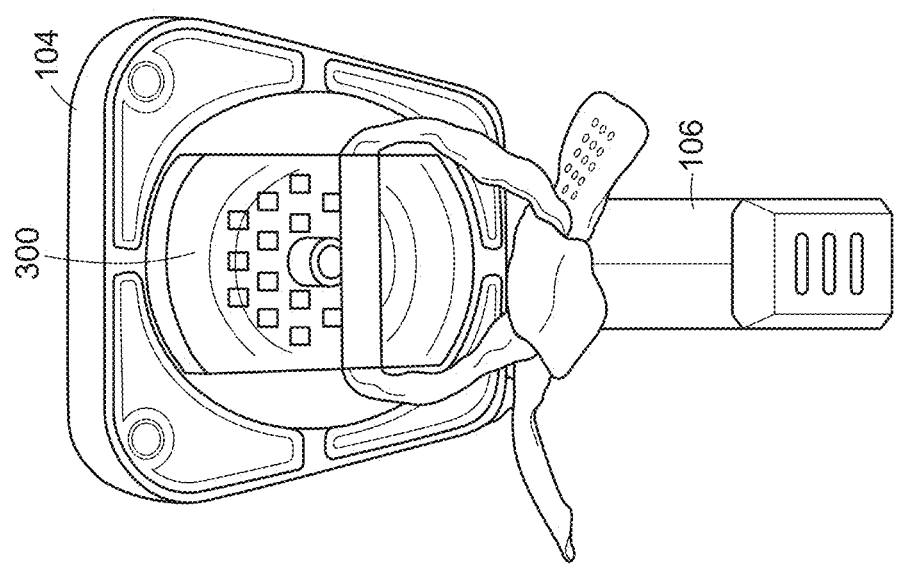
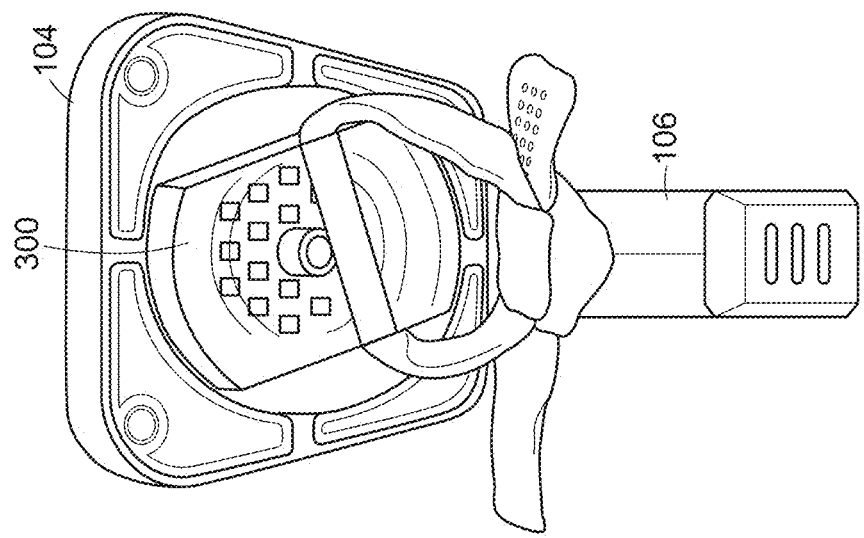

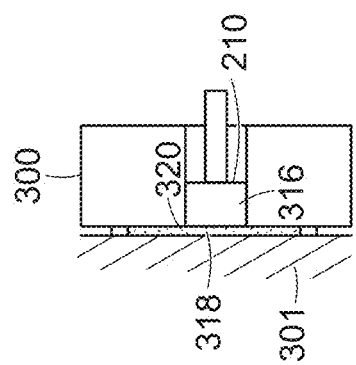
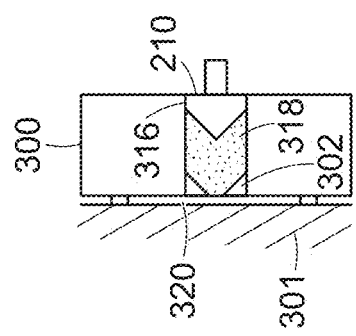
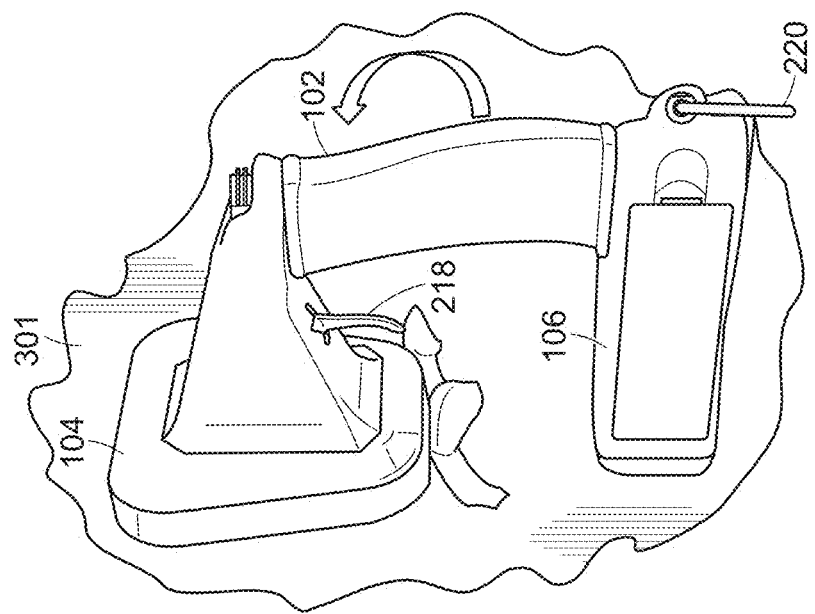

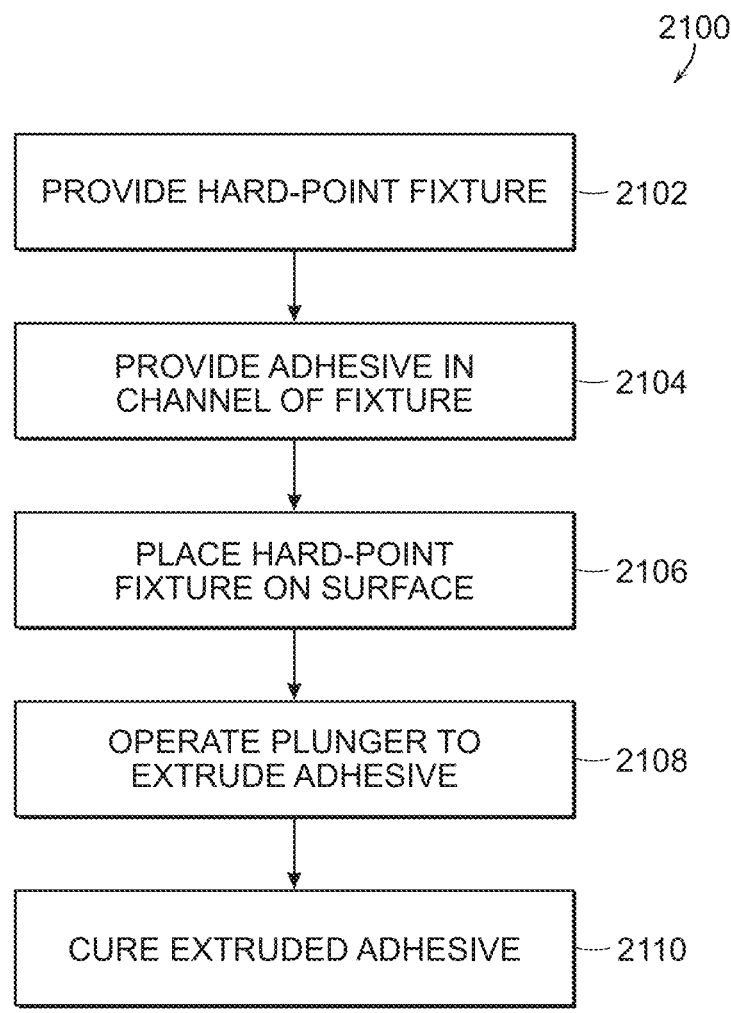

HARD-POINT FIXTURE AND SYSTEM FOR ATTACHING THE FIXTURE TO A TARGET SURFACE

RELATED APPLICATIONS

This application claims priority to U.S. Provisional Patent Application Ser. No. 62/510,165 filed May 23, 2017 for "Fixture Attaching System" and to U.S. Provisional Patent Application Ser. No. 62/537,211 filed Jul. 26, 2017 for "Fixture Attaching System," the entire contents of each of which is incorporated by reference in its entirety for all purposes.

GOVERNMENT RIGHTS

This work was done with U.S. government support under Contract No. CON02267 awarded by the U.S. Department of Defense. The U.S. government may have certain rights in the invention.

FIELD OF THE DISCLOSURE

The disclosure relates to attaching a hard-point fixture to a target surface.

BACKGROUND

As is known, U.S. warfighters operate in all manner of environments, including tight urban terrain in, and amongst, buildings. Historically, in order to overcome obstacles and secure entrance and egress routes, ropes, ladders and related climbing tools were used. The Charles Stark Draper Laboratory, Cambridge, Mass. has developed biologically-inspired climbing aids to enable warfighters to scale surfaces, e.g., vertical walls constructed from typical building materials, while carrying a full combat load, and without the use of ropes or ladders.

When climbing, a person may attach safety hard-points along the way to arrest a potential fall. On man-made structures, a climber may drill into a steel support structure and attach a bolt, if there is such a support structure available to establish a hard-point. This requires, however, that the user only climbs near, or on, something metal. Alternatively, and comparable to a typical approach to rock climbing, a solution might be to hammer or wedge a piton or cam into the surface or a groove on the surface. This approach, however, derails a stealthy ascent.

A system for attaching a safety hard-point fixture to a man-made structure is needed.

SUMMARY

In one aspect of the present disclosure, an apparatus for placing a hard-point fixture on a target surface comprises a handle; an applicator portion, coupled to the handle, defining a receiver portion configured to releasably couple to a hard-point fixture; an irradiating device, located in the applicator portion, configured to direct irradiating energy into the receiver portion; a trigger disposed in the handle; an actuator, coupled to the trigger, and positioned in the handle to extend into the receiver portion; and a controller, coupled to the irradiating device, configured to control the irradiating device.

In another aspect of the present disclosure, a method comprises: providing a hard-point fixture, wherein the hard-point fixture comprises: a body having first and second surfaces; a channel provided in the body having a first opening defined in the first surface of the body and a second opening defined in the second surface of the body; and a movable plunger disposed in the channel and configured to move from a first position to a second position; placing an adhesive in the channel; engaging the adhesive-loaded hard-point fixture with an applicator portion of a fixture placement apparatus; placing the hard-point fixture on a target surface to define an enclosed space between the hard-point fixture and the target surface; activating a trigger on the placement apparatus to move the plunger and extrude a portion of the adhesive from the channel into the enclosed space; activating an irradiating device in the placement apparatus to cure the extruded adhesive in the enclosed space by exposing the extruded adhesive to irradiating energy; and disengaging the hard-point fixture from the placement apparatus after the extruded adhesive is sufficiently cured to maintain the fixture in place on the target surface.

A portion of the fixture body may comprise a material that permits irradiating energy to pass through. The irradiating device may provide light in the ultraviolet spectrum, in the infrared spectrum or may be a heater. A portion of the fixture body surrounding the channel may block irradiating energy from passing into the channel. Adhesive material may be disposed in the channel and located between the channel first opening and the plunger located at the plunger first position. A module may be removably positioned in the fixture channel and the plunger may be positioned in the module. Adhesive material may be disposed in a reservoir of the module.

The adhesive material may be one of: a UV-curable epoxy; an IR-curable epoxy; a two component epoxy; a degradable adhesive; or a heat-curable epoxy.

A temporary attachment mechanism may be coupled to a first surface of the fixture body. The temporary attachment mechanism may comprise at least one of: a magnet; a suction cup; or a low to medium-tack pressure-sensitive adhesive.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures:

FIG. 3B is a side view of the hard-point fixture of FIG. 3A;

FIG. 3C is a perspective cutaway view of the hard-point fixture of FIG. 3A along the line A-A;

FIG. 3D is a cutaway side view of the hard-point fixture of FIG. 3A along the line A-A;

FIGS. 5A and 5B are views of the hard-point fixture of FIGS. 3A-3C installed in the fixture attaching system of FIGS. 1A and 1B;

FIG. 6 is a view of the fixture attaching system applying the hard-point fixture to a target surface;

FIGS. 7A and 7B are side views of the hard-point fixture being applied to the target surface by the placement of adhesive;

FIG. 21 is a flowchart of a method in accordance with an aspect of the present disclosure.

DETAILED DESCRIPTION

Figure 1A:
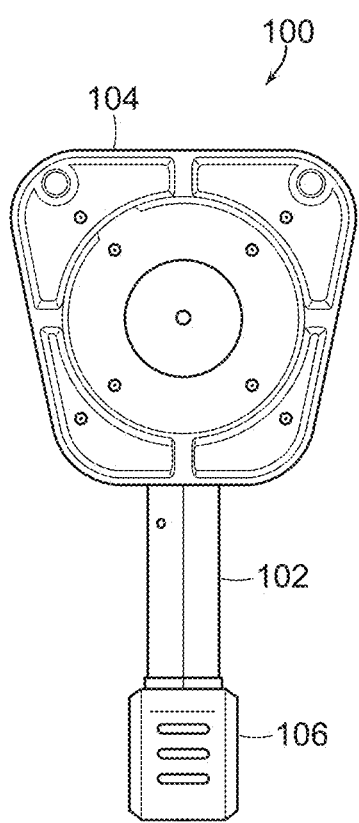
FIG. 1A is a front view of a fixture attaching system according to an aspect of the present disclosure.

The entire contents of each of U.S. Provisional Patent Application Ser. No. 62/510,165, filed May 23, 2017 for "Fixture Attaching System" and U.S. Provisional Patent Application Ser. No. 62/537,211, filed Jul. 26, 2017 for "Fixture Attaching System," are hereby incorporated by reference in their entirety for all purposes.

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

It is to be understood that the present disclosure is not limited in its application to the details of construction and the arrangement of the components set forth in the following description or illustrated in the drawings as it is capable of implementations or of being practiced or carried out in various ways. Also, it is to be understood that the phraseology and terminology employed herein are for the purpose of description only and should not be regarded as limiting.

Certain features, which are, for clarity, described in the context of separate implementations, may also be provided in combination in a single implementation. Conversely, various features, which are, for brevity, described in the context of a single implementation, may also be provided separately or in any suitable sub-combination.

In one aspect of the present disclosure, a system includes a mechanically actuated adhesive dispensing mechanism and an electronic adhesive curing system. Examples of adhesive, as set forth herein, include epoxy, specifically UV-cured epoxy, however, the aspects of the present disclosure are not limited only to use of an epoxy adhesive, UV-cured or otherwise.

Advantageously, the system is capable of attaching a hard-point fixture, or puck, to a target surface in approximately 30 seconds. It should be noted that "puck" and "hard-point fixture" are used interchangeably in the present disclosure. The puck may be made of, in one example, an ultraviolet (UV) transparent acrylic and stores a UV curable epoxy, e.g., Dymax 431, in a reservoir that is protected from UV radiation, i.e., the UV radiation is blocked, and is air-tight. In one mode of operation, the puck is installed into a handle of the system via, for example, a locking or keyed mechanism. The handle is positioned to place the puck against a target surface and a trigger is activated. The trigger actuates a plunger mechanism within the puck, dispensing the adhesive from the reservoir onto an adhesion surface area, and into a space defined by the puck and the surface. The system incorporates a plurality of UV LEDs, i.e., those that emit light in the UV spectrum, in the case of UV-cured epoxy. The UV LEDs are positioned to irradiate the epoxy that has been dispensed onto the adhesion surface area between the puck and the target surface. The LEDs are turned on to begin a timed curing process of the epoxy. Once the curing process is complete, the puck is released via the locking mechanism and the handle is removed, leaving the puck affixed to the target surface.

Figure 1B:
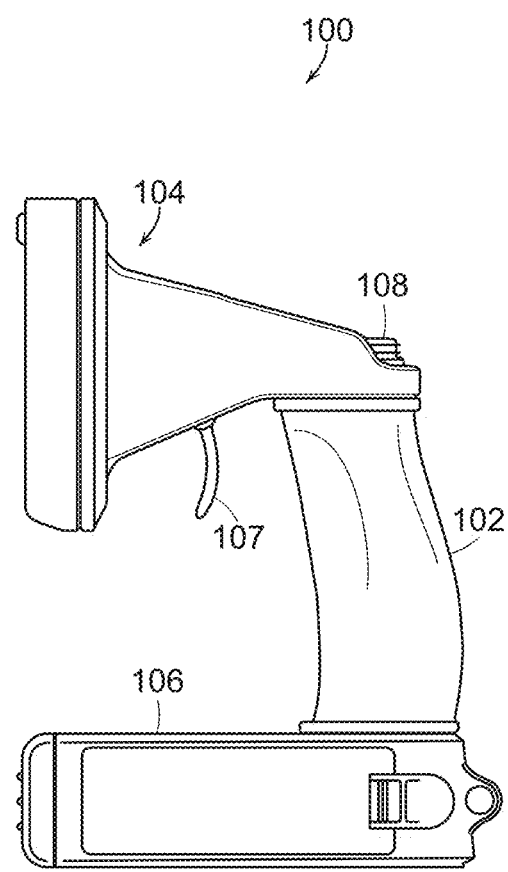
FIG. 1B is a side view of a fixture attaching system according to an aspect of the present disclosure.

Referring now to FIGS. 1A and 1B, in one aspect of the present disclosure, a fixture attaching system 100 includes a handle 102 coupling an applicator portion 104 to a power source compartment 106. An on/off button 108 is provided to initiate an epoxy curing process as will be described herein. In addition, a trigger 107 is provided in the applicator portion 104. The trigger 107 may be spring-loaded to return to a "withdrawn" position as will be understood from the description herein.

In one non-limiting example, the fixture attaching system 100 is about 10 inches in overall length, with the application portion 104 being about 5 inches at its widest point and the power source compartment 106 having a length of about 7 inches. The handle 102 may be coupled to the applicator portion 104 so that each can be moved or rotated relative to the other. Further, the power source compartment 106 may also be rotatably coupled to the handle. Still further, the power source may be provided within the handle.

Figure 2B:
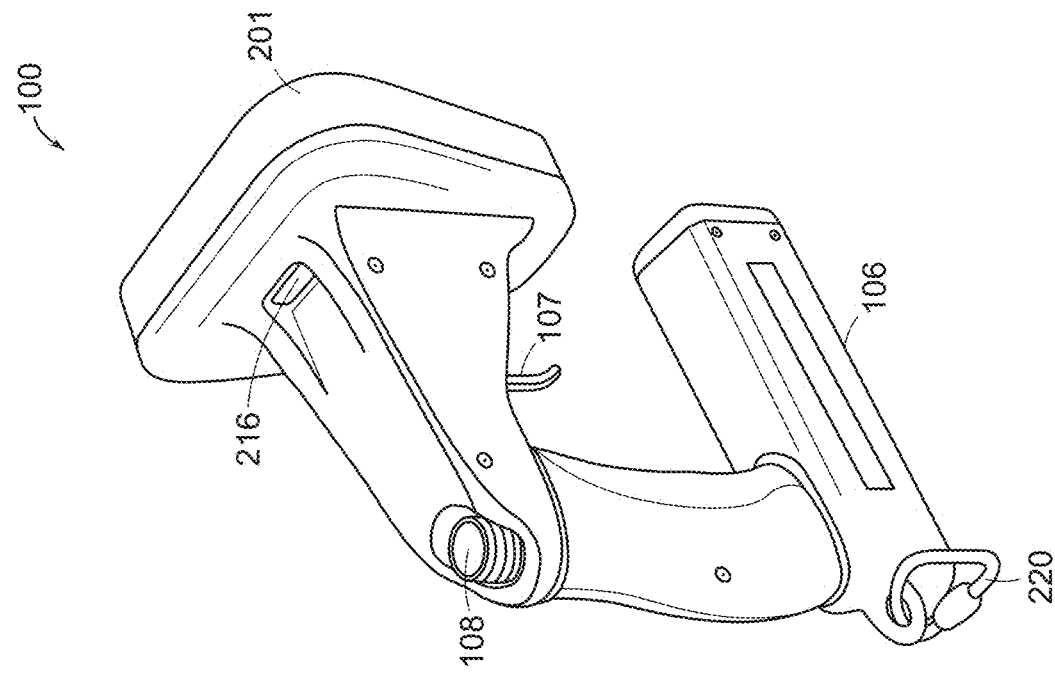
FIGS. 2A and 2B are perspective views of the fixture attaching system of FIGS. 1A and 1B.
Figure 2A:
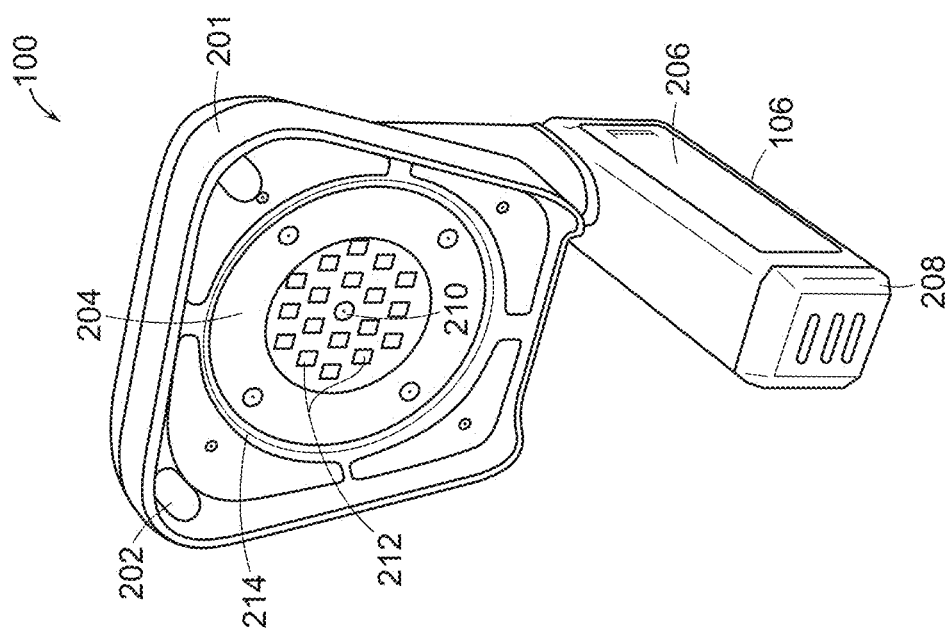
Figure 3A:
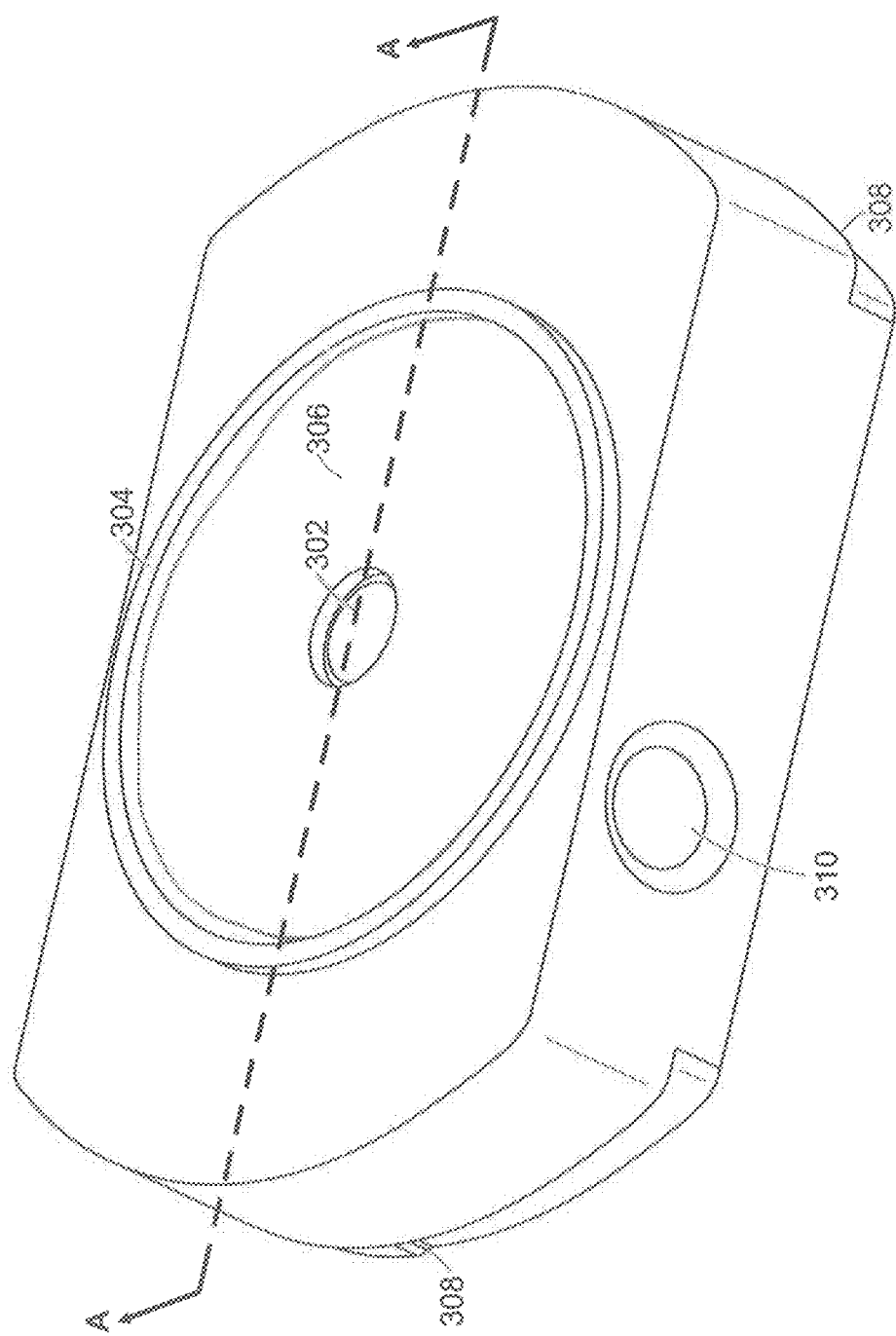
FIG. 3A is a perspective view of a hard-point fixture according to an aspect of the present disclosure.

As shown in FIGS. 2A and 2B, in one example of an aspect of the disclosure, the fixture attaching system 100 includes an applicator section or cavity 201 in which a transparent protective lens 204, a plunger actuator 210, an irradiating device, for example, an array of UV LEDs 212, and a twist lock rim 214 are provided. The lens 204 may be made of acrylic or similar material that is transparent to the wavelengths of light emitted by the LEDs 212. The power source compartment 106 includes a battery door 206, an upper wall bumper 202, a lower wall bumper 208, and, optionally, a belt clip loop 220.

A hard-point fixture or "puck" 300 for attachment to a target surface 301 by the fixture attaching system 100 is presented in FIGS. 3A-3D. As shown, in one aspect of the present disclosure, the puck 300 includes an adhesive reservoir blister membrane 302, an adhesion surface lip 304, an adhesion surface 306 defined by the adhesion surface lip 304, one or more twist lock features 308, an attachment through hole 310, an adhesive reservoir 312, one or more plunger O-rings 314 and a plunger 316. The twist lock features 308 correspond to the twist lock rim 214 in order to hold the puck 300 in the applicator section 201, i.e., the puck 300 is keyed to the applicator section 201. Advantageously, the twist lock features 308 assure that the puck 300 is properly placed.

Figure 17A:
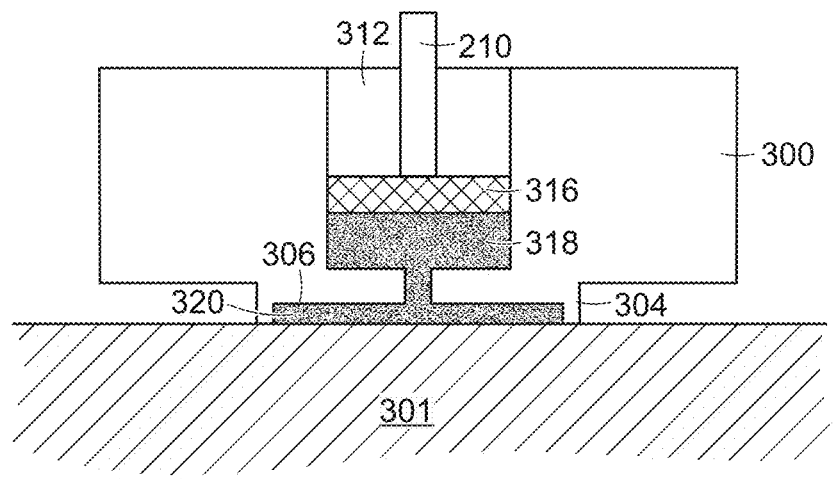
FIG. 17A is cutaway cross-sectional view of a hard-point fixture with a single epoxy reservoir.
Figure 17B:
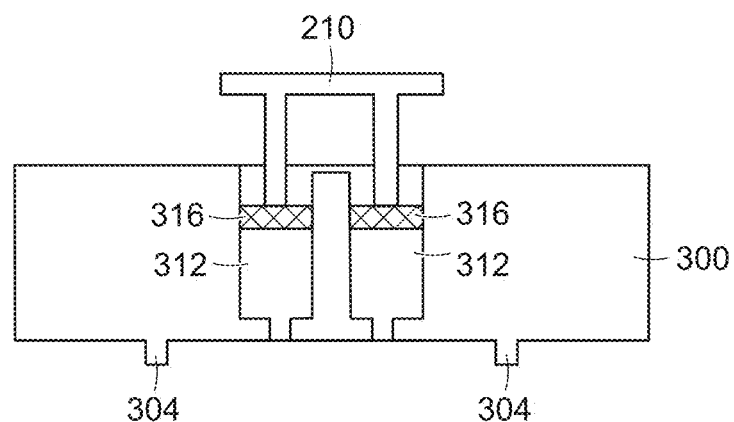
FIG. 17B is a cutaway cross-sectional view of a hard-point fixture with a multiple epoxy reservoirs.

In one aspect, referring to FIG. 17A, the puck 300 includes a single adhesive reservoir 312. Alternatively, a multi-reservoir implementation, i.e., more than one adhesive reservoir 312, per FIG. 17B, may be used to provide an adhesive 318 onto the adhesion surface 306. The same adhesive material may be provided in each reservoir of the multi-reservoir implementation. Alternatively, a two component epoxy could be used where each component is in its own respective reservoir and are mixed when extruded. Of course, one of ordinary skill in the art will understand that a two component epoxy could be placed in a single reservoir as long as they were separated until needed.

Figure 4:
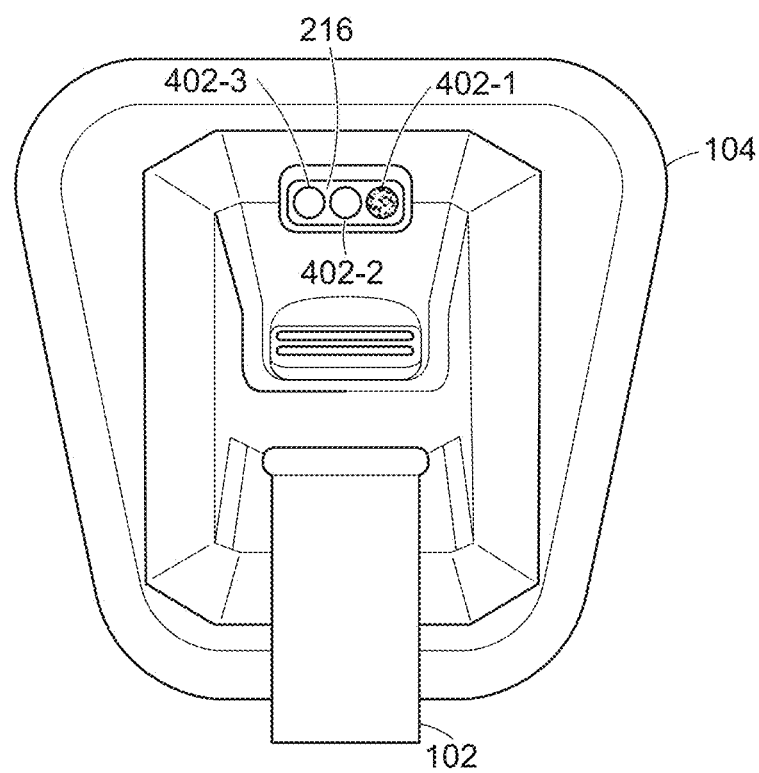
FIG. 4 is a top view of the fixture attaching system of FIG. 1A.

The status display 216 in the fixture attaching system 100, as shown in FIG. 4, may represent current status conditions using a plurality of LEDs 402. In one non-limiting example, one LED 402-1 may indicate that a curing cycle, for example, to cure an epoxy, is running or currently ON, while another LED 402-2 may indicate a "battery low" condition or voltage out of range. Still further, another LED 402-3 may indicate that one or more curing LEDs, discussed below, is non-operational or malfunctioning. The foregoing indications by the one or more display LEDs 402-x are exemplary only and not limiting. Further, combinations of LEDs being lighted, not-lighted and/or blinking may indicate another status or mode of operation. Still further, LEDs of different colors may be implemented. Even further, an alphanumeric display, for example, of an OLED type, may be incorporated.

In operation, referring to FIGS. 5A and 5B, the puck 300 is aligned with openings in the twist lock rim 214 and then turned, for example, clockwise, to slide into place. In one aspect of the present disclosure, the twist lock rim 214 and puck 300 are configured with respect to one another such that the puck 300 will only slide into place when in the correct orientation of the attachment through hole 310 with respect to the epoxy reservoir 312, as shown.

Once the puck 300 is placed properly in the applicator 100, referring now to FIG. 6, the attachment process can be initiated. An area on the target surface 301 where the puck 300 will be attached may be cleaned or otherwise prepared as needed and the applicator portion 104 of the system 100 positioned on the target surface 301. The adhesion surface lip 304 of the puck 300 should be flush with the target surface 301 for optimum attachment and holding strength. If necessary, the handle 102 may be tilted away if the target surface 301 has a slight curvature or some other irregularity in order to maximize surface area contact. Of course, one of ordinary skill in the art would understand that the geometry of the target surface 301 will affect the placement options.

Once the puck 300 is positioned at the desired location on the target surface 301, the dispense trigger 107 is actuated by pulling on it. Pulling on the trigger 107 will cause the plunger actuator 210 to extend and push into the reservoir 302, as shown in FIGS. 7A and 7B. The adhesive 318 will break through the reservoir blister membrane 302 and fill the cavity area 320 coupling the adhesion surface 306 to the target surface 301, as shown.

In operation, the adhesive 318 is extruded into a cavity or space 320 defined by the surface lip 304 and the target surface 301 to which the puck 300 is attached as shown in FIG. 17A. The adhesive, once cured, couples to the adhesion surface 306 of the puck 300 and the target surface 301 in order to maintain the puck 300 in position.

In one aspect of the present disclosure, a sensor, for example, but not limited to, a proximity sensor, is used to confirm that the plunger actuator 210 has been pushed as far as it will go, thus releasing the desired amount of adhesive 318 into the cavity 320. The sensor may be monitored by a controller, or similar device, coupled to a visual indicator, for example, an LED, to indicate when the plunger actuator 210 has completed its travel. For example, the LED may turn on or off when complete or change from one color to a next. One of ordinary skill in the art will understand that there are a number of different approaches to implementing this aspect of the present disclosure.

Figure 8:
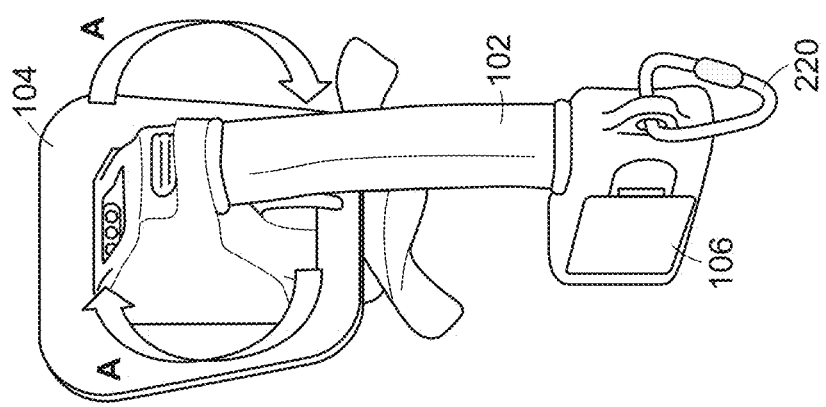
FIG. 8 is a view of the fixture attaching system applying the hard-point fixture to the target surface.

In some instances, it may be beneficial to slightly swirl or rotate, along the direction of the arrows A shown in FIG. 8, the applicator portion 104 to ensure even spreading of the dispensed adhesive 318.

Once the adhesive 318 has been positioned in place as desired, the curing process can be initiated. The on/off button 108 is actuated to begin the epoxy curing by turning on power to the UV LEDs 212. If the system 100 is working properly, one of the status LEDs 402 may light, for example, as green indicating proper operation. Control circuitry within the fixture attaching system 100 includes a timer circuit to operate the UV LEDs 212 for a predetermined amount of time, for example, 10-60 seconds, nominally 15 seconds, for each cycle.

When the timed UV LED cycle ends, the display LEDs 402 may indicate an end to the cycle. In some aspects of the present disclosure, additional curing cycles may be necessary and a curing cycle can be repeated as necessary. In one non-limiting example, two curing cycles, for a total of about 30 seconds of curing time, are needed. This may vary depending upon the type of adhesive 318, the amount of adhesive being used and the amount of adhesive surface area being cured.

Figure 9:
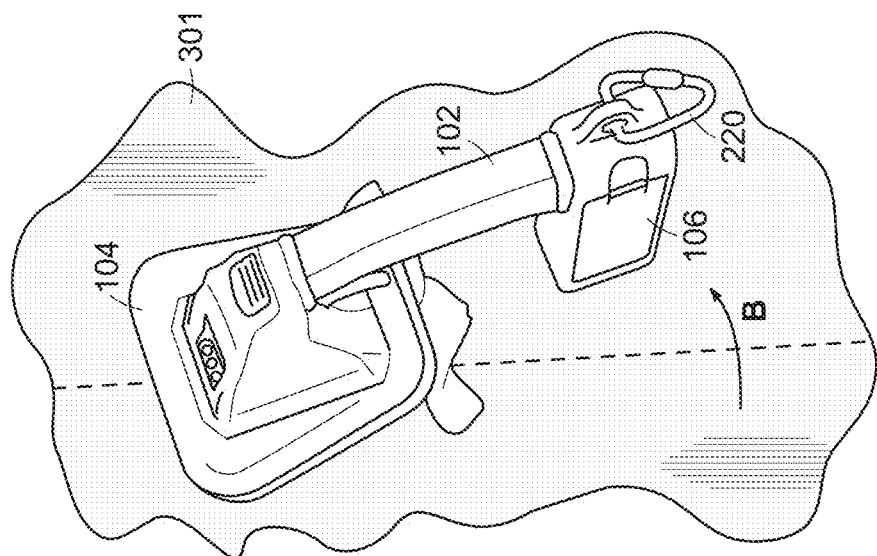
FIG. 9 is a view of the fixture attaching system being removed to leave the hard-point fixture in place on the target surface.

Once the adhesive 318 has been cured, the fixture attaching system 100 can be removed. Referring to FIG. 9, the handle 102 is turned, i.e., pivoted, in the direction shown by the arrow B, thus pivoting around the puck 300. This rotating motion will move the twist lock rim 214 and disengage from the puck 300 allowing the handle 102 to be removed from the puck 300 which will remain on the surface 301.

Figure 10A:
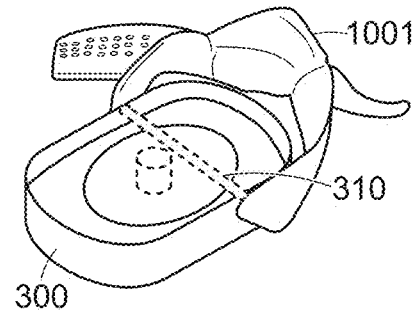
FIGS. 10A and 10B are views of various attachments coupled to the hard-point fixture.
Figure 10B:
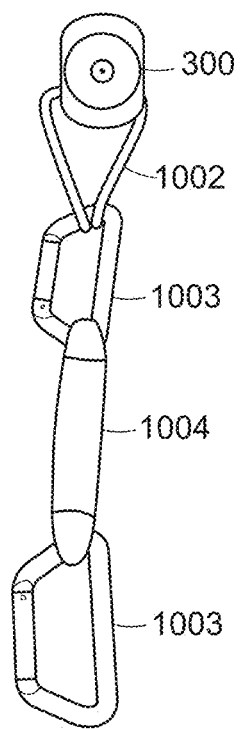

Referring now to FIGS. 10A and 10B, the puck 300 may be provided with different types of attachment mechanisms such as tied fabric webbing 1001, for example, fabric made with Nylon. Alternatively, referring to FIG. 10B, a fabric runner 1002, for example, 5-20 mm, also made with Nylon in one embodiment and optimally 10 mm, may be provided. In addition, for example, a carabiner 1003 may be attached to the runner 1002. Further, a screamer 1004, as known to climbers, may be used to lower the load experienced by both the climber and the hard-point, and may be attached as shown.

Figure 11:
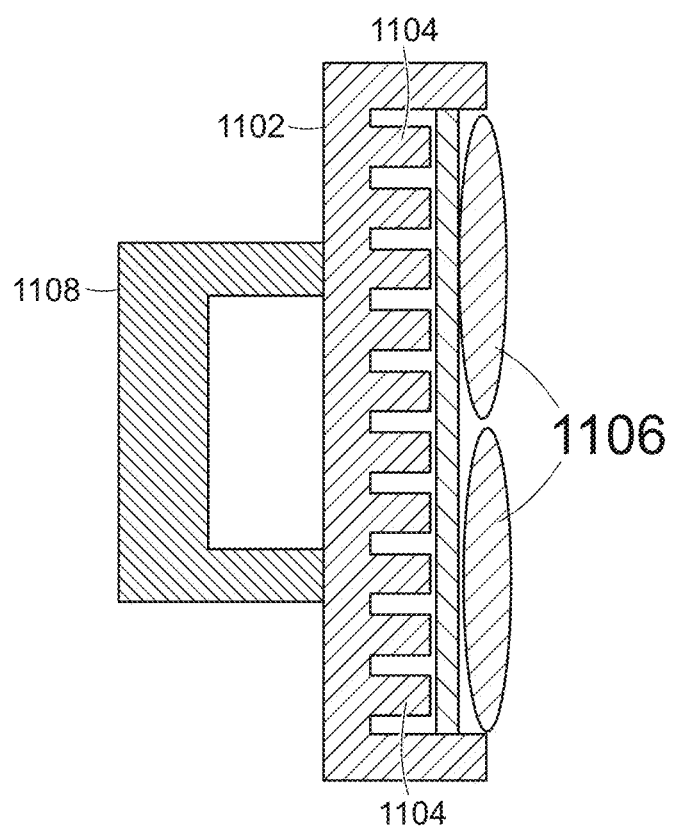
FIG. 11 is a puck according to an alternate aspect of the present disclosure.

In an alternate approach, referring to FIG. 11, a frame 1102 with a plurality of UV LEDs 1104 and blister packs 1106 containing UV curable epoxy is provided. A handle 1108 is coupled to the frame 1102 and includes both the battery or batteries to power the UV LEDs and a switch to initiate the curing cycle (not shown). In operation, the frame 1102 is pressed onto a target surface with sufficient force to break the epoxy blister packs 1106 and distribute the epoxy onto the target surface. The UV LEDs 1104 are then triggered to cure the epoxy to both the frame and the target surface to create a hard attachment point.

Figure 12:
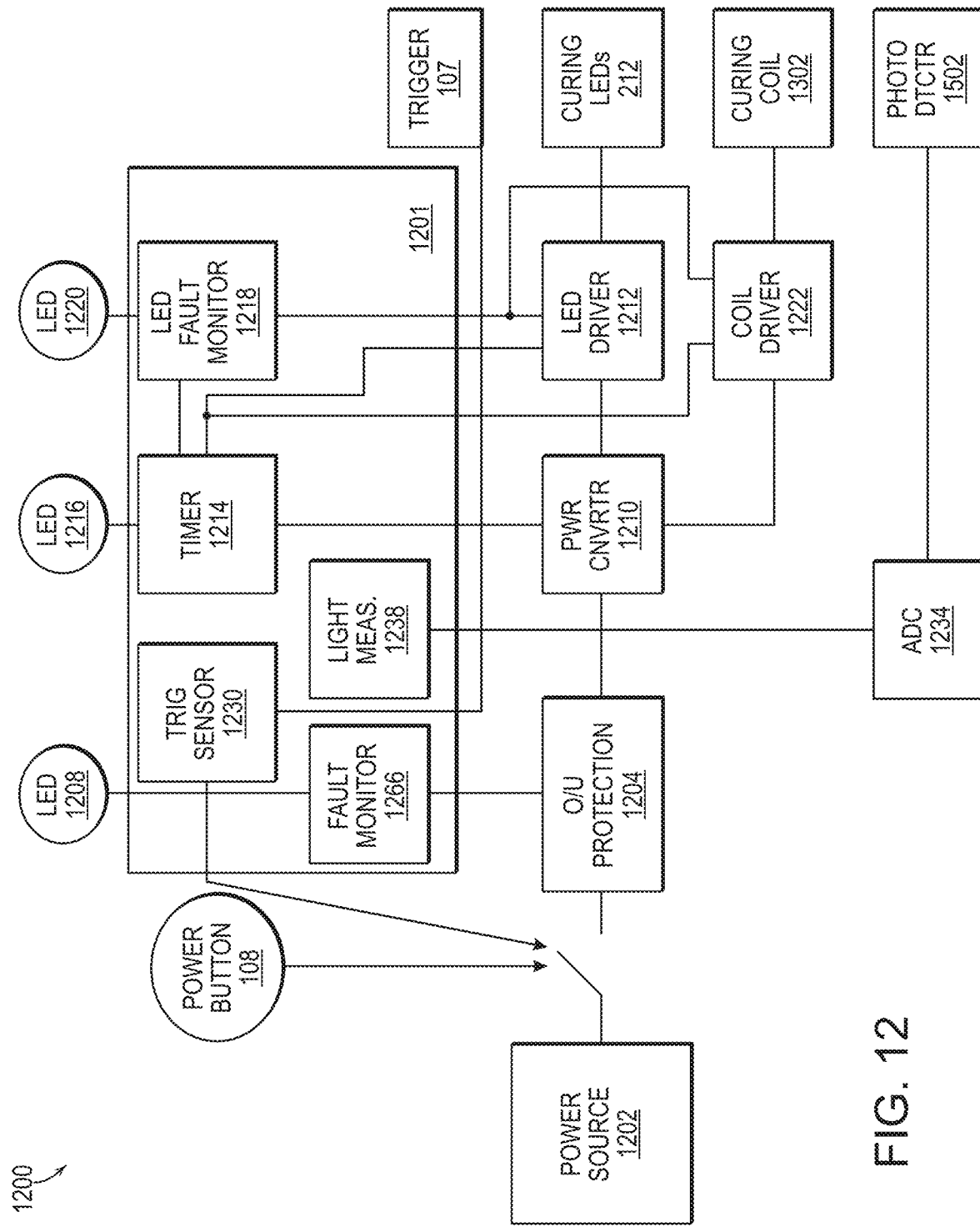
FIG. 12 is a functional block diagram of a control system in accordance with an aspect of the present disclosure.

In one aspect of the present disclosure, as shown in FIG. 12, a control system 1200 includes various components, including a controller 1201 configured to control the operation as set forth herein. The on/off button 108, shown in FIG. 1B, couples a power source 1202, e.g., a battery, to an over/under power protection module 1204. The protection module 1204 protects the remaining components from a power source that is out of its specified range. A fault monitor module 1206 in the controller 1201 is coupled to the protection module 1204 and indicates, with an LED 1208, for example, whether the power source voltage is operating correctly or not. The fault monitor module 1206 may cause the LED 1208 to light, blink, etc., in order to indicate status. A power converter 1210 is coupled to the protection module 1204 and is configured to convert an output voltage of the power source 1202 to a voltage level for an LED driver 1212 of the curing LEDs 212. In one non-limiting example, the power source voltage may be 14.8 Volts where the power converter steps that down to 5 Volts.

A timer module 1214 is coupled to the power converter 1210 and controls how long the curing LEDs 212 are turned on. While the timer 1214 is running, it may indicate its status on an LED 1216. An LED fault monitoring module 1218 is coupled to the timer 1214, the LED driver 1212 and an indicator LED 1220 that is used to present the status of the system.

A trigger sensing module 1230 is coupled to the trigger 107 to determine the status of the trigger 107. For example, if the trigger 107 is sensed as having moved from a starting position to an extended position and back to the starting position, this could be interpreted as the adhesive has been distributed and is ready for curing. In one approach, the curing might be started automatically or the curing start button could be "armed" and ready to begin the curing process. One of ordinary skill in the art will understand that there are alternatives to how the process is initiated.

One of ordinary skill in the art will also understand that the various functions of the fault monitor 1206, timer 1214 and LED fault monitor 1218, while described as being a module or otherwise, may be a hardware circuit, software or a hybrid, combined in a single device or component, for example, a processor, micro-controller, FPGA, etc., with associated instructions stored in a memory, that is configured and/or programmed to operate according to the teachings of the present disclosure.

In addition, it would be understood by one of ordinary skill in the art that the various modules or functions, being shown within the controller, or outside it, are exemplary only. One of ordinary skill in the art will understand that incorporating, or not incorporating, a function within a controller is a design choice.

Figure 13:
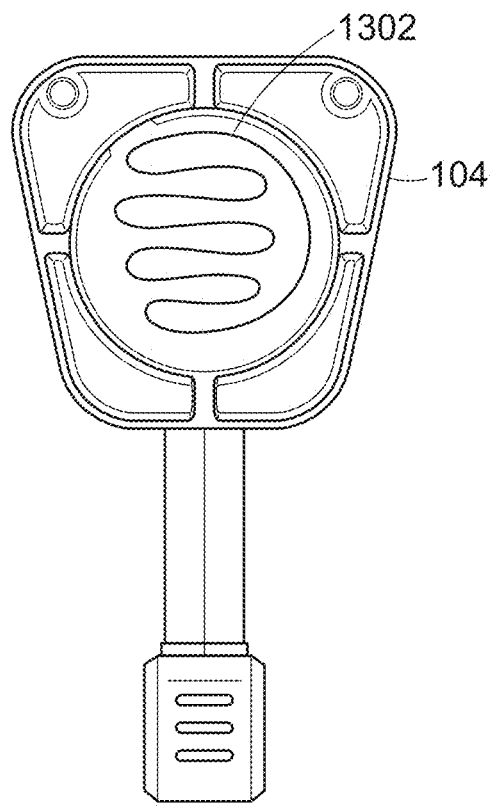
FIG. 13 is a front view of a fixture attaching system according to an aspect of the present disclosure where a heating coil is implemented.

While UV-cured epoxy has been described herein in one example of an applicable adhesive, in another aspect of the present disclosure, a heat-cured epoxy may be implemented. In this regard, a heating coil 1302, as shown in FIG. 13, is provided. The heating coil 1302 is operated, as shown in FIG. 12, by a coil driver 1222 coupled to the controller 1201. One of ordinary skill in the art would understand that the cure time would be under control of the controller 1201 based on the type of epoxy being used. In addition, other types of mechanisms for providing heat to the epoxy could be used.

In another aspect of the present disclosure, a puck may be configured to have all of the functionality of the applicator portion, i.e., the LEDs, the controller, plunger, etc. In addition, such an "all-in-one" puck may provide "place-and-forget" functionality where the control circuitry to dispense and cure the epoxy to affix the puck to the target surface operates without input from the user after its initial placement.

Figure 14:
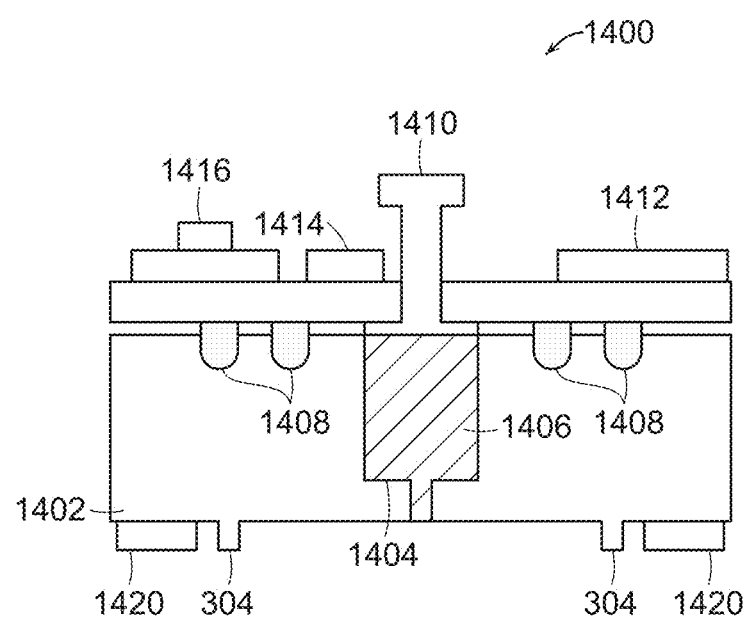
FIG. 14 is a cross-sectional view of a hard-point fixture in accordance with an aspect of the present disclosure.

Referring now to FIG. 14, an all-in-one puck 1400 includes a puck body 1402 with a reservoir 1404 containing, in a non-limiting example, UV-curable epoxy 1406. A number of LEDs 1408 are provided to cure the epoxy 1406 once distributed by a plunger 1410. A battery 1412 is provided to power the LEDs 1408 and control circuitry 1414. A switch 1416 is coupled to the control circuitry 1414 and the battery 1412 to initiate the curing process. The switch 1416 may include an indicator LED. The control circuitry 1414 may include a subset of the components and functions shown in the control system 1200.

In operation, a user positions the puck 1400 at the desired location. The plunger 1410 is then pressed to distribute the epoxy 1406 from the reservoir 1404. Once the epoxy 1406 is in place, the curing process may be initiated by operation of the switch 1416.

The control circuitry 1414 may be pre-configured to cure the epoxy 1406 for a predetermined amount of time and not require subsequent interaction from the user. Alternatively, the control circuitry 1414 may be set to irradiate for an amount of time and the user may have to initiate a number of cycles. Still further, the plunger 1410 and the switch 1416 may be integrated into one function such that when the plunger 1410 has traveled its full length, the curing process starts, either immediately or after a set delay.

In order to aid in the placement of the puck 1400, one or more temporary attachment mechanisms 1420 may be provided. The temporary attachment mechanism 1420 allows for the re-positioning of the puck 1400 on the target surface 301 prior to the release of the adhesive. The temporary attachment mechanism 1420 may be, in one non-limiting example, a magnet for use on a metal surface. Alternatively, a low- to medium-tack pressure-sensitive adhesive, similar to that which is found on a Post-It® note, adhesive tape or the like may be used. The pressure-sensitive adhesive could be placed on the adhesion surface lip 304. Further, the adhesion surface lip 304 could be a circular magnet itself. Still further, the temporary attachment mechanism 1420 may also include one or more suction cups.

In another aspect of the present disclosure, the irradiance is measured, and the cure time, i.e., the time duration the LEDs are activated, is adjusted as a function of the amount of irradiance provided. When sufficient irradiance has been provided, the LEDs are turned off.

Figure 15:
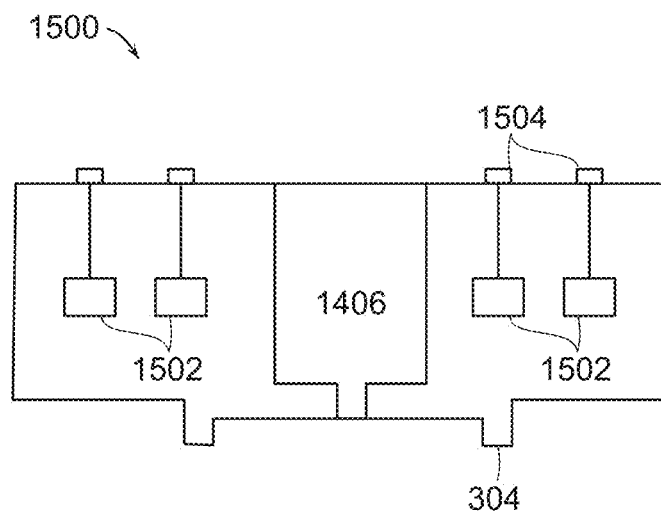
FIG. 15 is a cross-sectional view of a hard-point fixture in accordance with another aspect of the present disclosure.

Accordingly, referring to FIG. 15, a puck 1500 is provided with a plurality of embedded UV photodetectors 1502. Each photodetector 1502 provides a signal that is proportional to an amount of UV radiation it receives or detects, through a coupling, for example, a pad or via 1504, to be detected by the controller. The amount of detected UV radiation is used in a feedback loop to control the curing LEDs. Thus, referring to FIG. 12, the photodetectors 1502 may be coupled to, for example, an analog-to-digital converter (ADC) 1234 that provides measurements of the curing radiation to a light measuring module 1238 in order to determine how much curing radiation has been delivered and to shut down when the appropriate level has been met.

If the UV irradiance level is high, the cure cycle will be completed quickly. If the UV irradiance level is low, the cure cycle may take longer and will only end once the controller determines that sufficient energy has been provided. If the UV irradiance is determined to be too low to provide an effective cure, a fault will be indicated to the user.

While UV photodetectors have been described above, where an IR-curable adhesive or a heat-curable adhesive is used, one of ordinary skill in the art will understand that the appropriate sensor, for example, an IR photodetector or a thermometer, would be used to measure the amount of irradiance.

Figure 16:
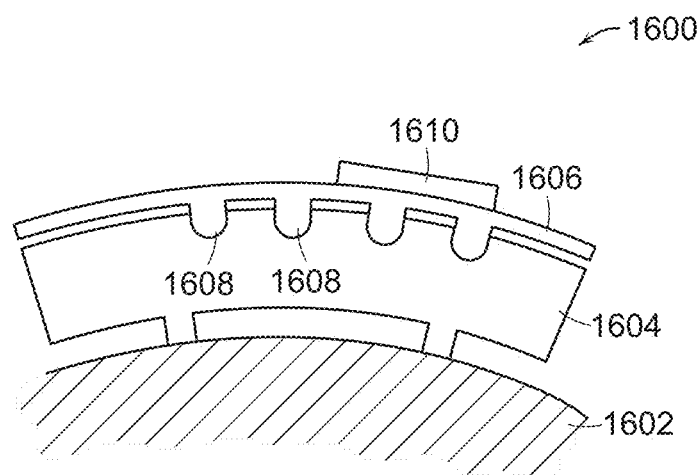
FIG. 16 is a cross-sectional view of a hard-point fixture in accordance with another aspect of the present disclosure.

There may be situations where the target surface is curved or may have a certain amount of flexibility. It has been shown that warping of the surface can lead to a premature failure of the puck-epoxy-surface interface. Accordingly, referring to FIG. 16, an "all-in-one" puck 1600 is provided that conforms to a curved or flexible surface 1602. A body 1604 of the puck 1600 may be made from a polymeric organosilicon compound such as Polydimethylsiloxane (PDMS) for low strength applications, a UV-transparent polymeric fiber or a UV-transparent, pliable urethane or rubber. The puck 1600 includes a flexible electronic circuit 1606 including LEDs 1608 and control circuitry 1610.

In addition, an articulating LED housing can be provided in the system shown in FIGS. 1A-2B when used with a puck made from a flexible material. Accordingly, the arrangement of the curing LEDs would then conform to the flexible puck and the target surface.

Figure 18A:
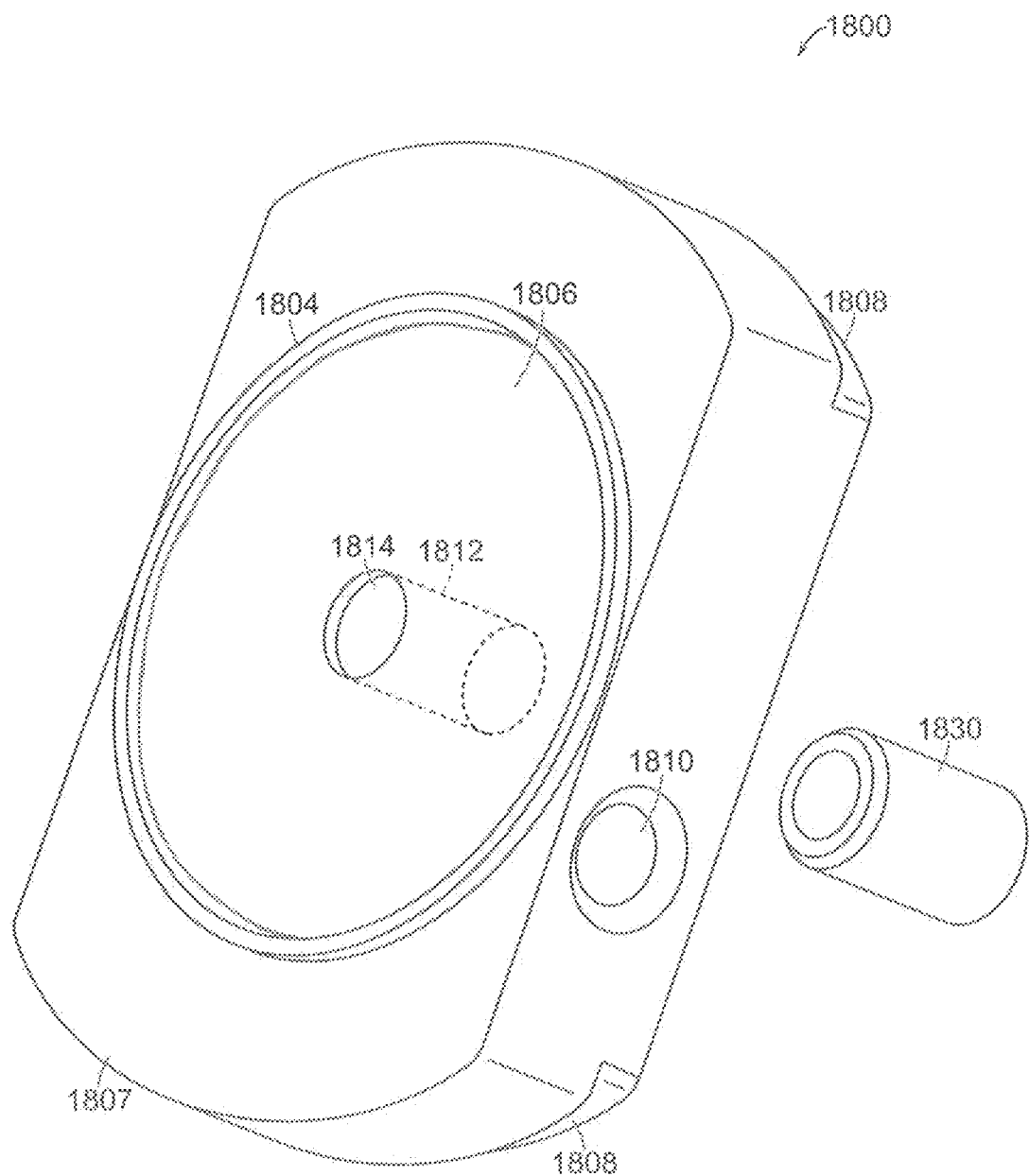
FIG. 18A is a perspective view of a fixture or hard-point fixture according to an aspect of the present disclosure.
Figure 18B:
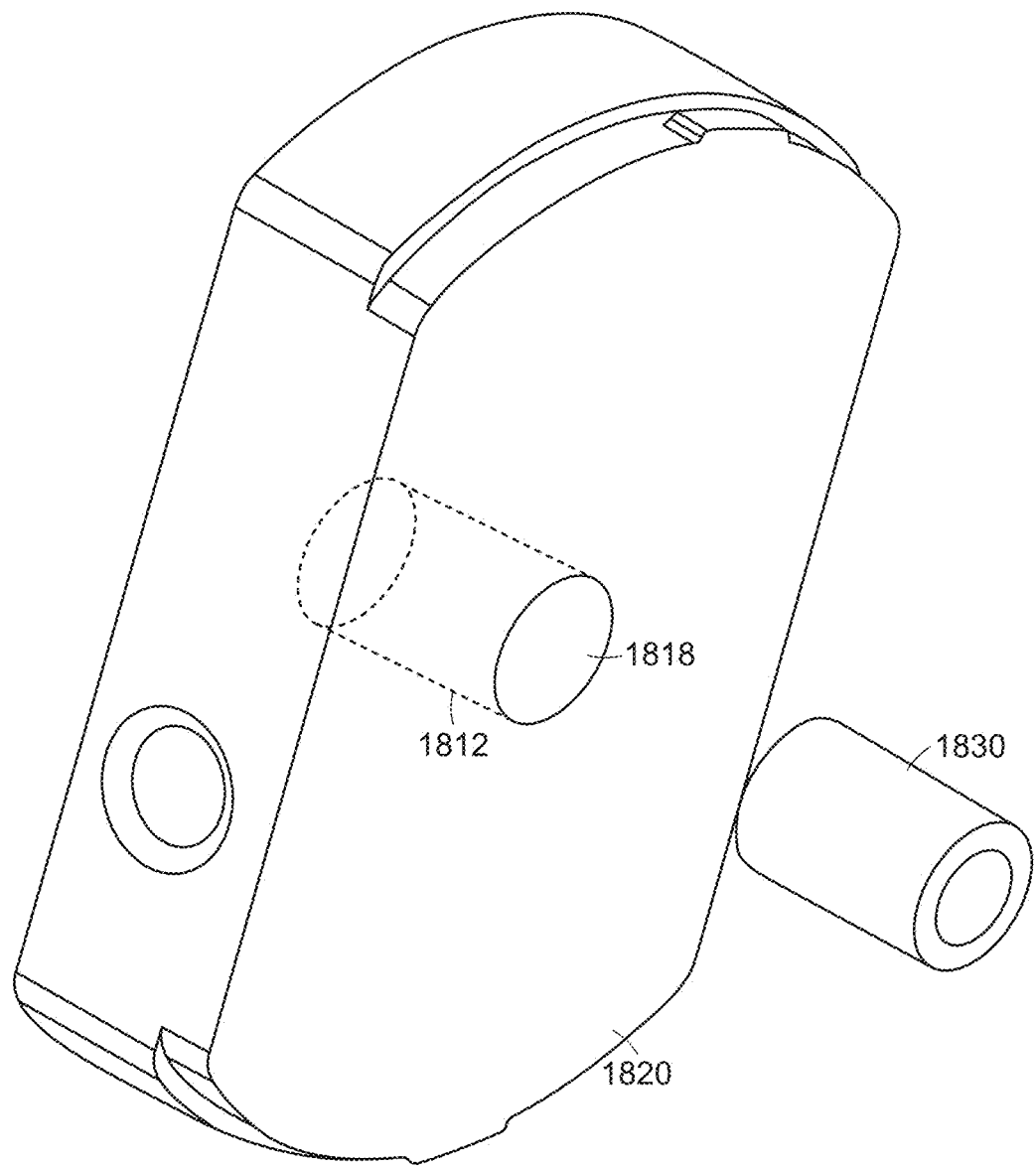
FIG. 18B is a perspective view of a fixture or hard-point fixture according to an aspect of the present disclosure.

In another aspect of the present disclosure, a puck 1800, similar to the pucks described above for use with the fixture attaching system 100 or the "all-in-one" approach, is presented in FIGS. 18A and 18B. As shown, the puck 1800 includes an adhesion surface lip 1804 to define an adhesion surface area 1806 on a first surface 1807 of the puck 1800. In addition, one or more twist lock features 1808 may be provided for a keyed relationship to the applicator section 201. An attachment through hole 1810 may also be defined in the puck 1800.

A generally cylindrical channel 1812 is defined in the puck 1800 to run from a first opening 1814 in the first surface 1807, in one embodiment centered in the defined adhesion surface area 1806, to a second opening 1818 defined in a second surface 1820 of the puck 1800. The channel 1812 may be counter-sunk in that the first opening 1814 has a smaller diameter than the second opening 1818.

The channel 1812 and the second opening 1818 are sized to receive an adhesive module 1830. In operation, the adhesive module 1830 is "loaded" into the puck 1800 through the second opening 1818 in the second surface 1820 and inserted until stopped by the smaller first opening 1814.

Figure 19A:
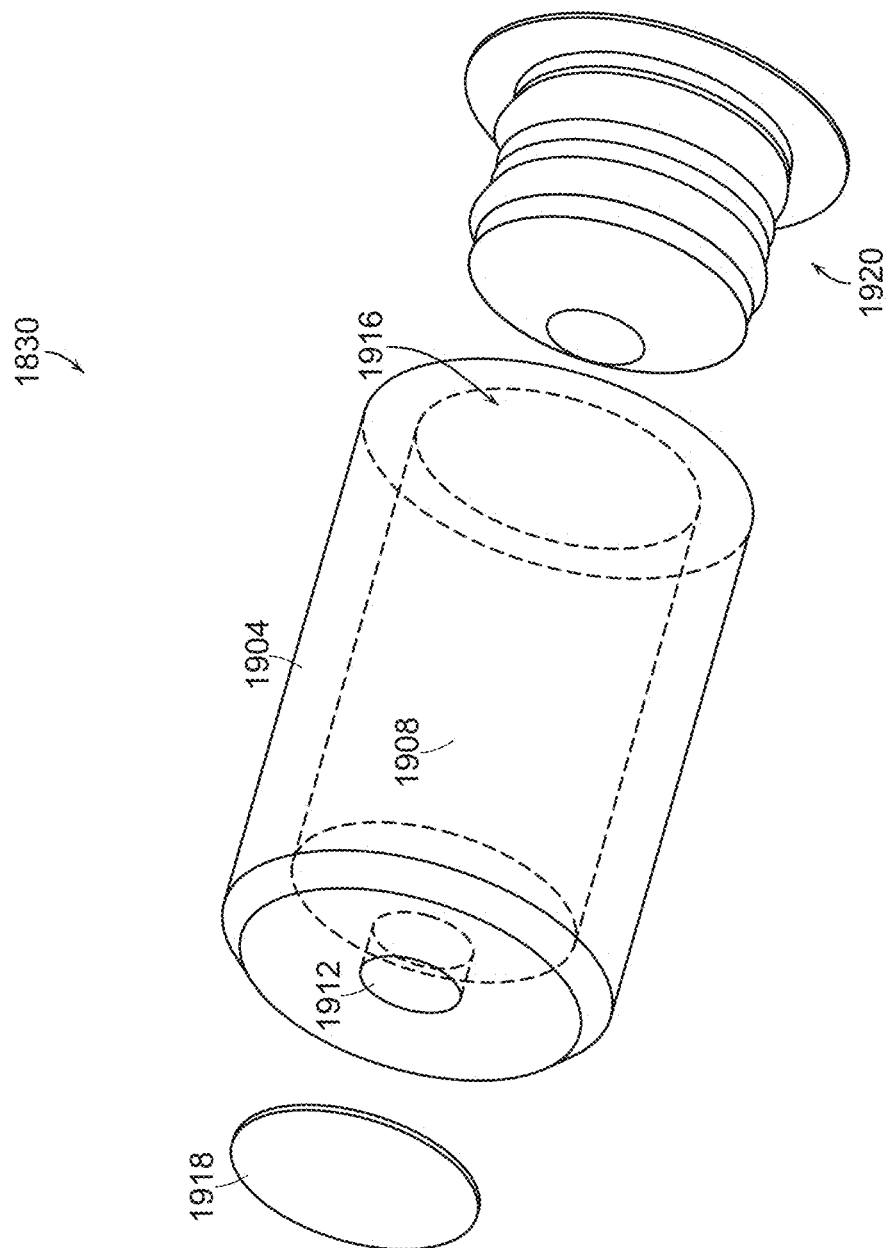
FIG. 19A is an exploded perspective view of an adhesive module according to an aspect of the present disclosure.

The adhesive module 1830 includes a cylindrical housing 1904, as shown in FIG. 19A. The housing 1904 has an outer diameter about a same size as an inner diameter of the channel 1812 in order to provide a friction fit between the adhesive module 1830 and the inner wall of the channel 1812. A reservoir 1908 is defined within the housing 1904 having a first opening 1912 and a second opening 1916, each fluidly coupled to the reservoir 1908. The reservoir 1908 is configured to receive an amount of adhesive, for example, an epoxy, to attach the puck 1800 to a surface, as described herein. A first blister membrane 1918 is provided over the first opening 1912 to maintain any adhesive in the reservoir 1908 in an air-tight enclosure.

Figure 19B:
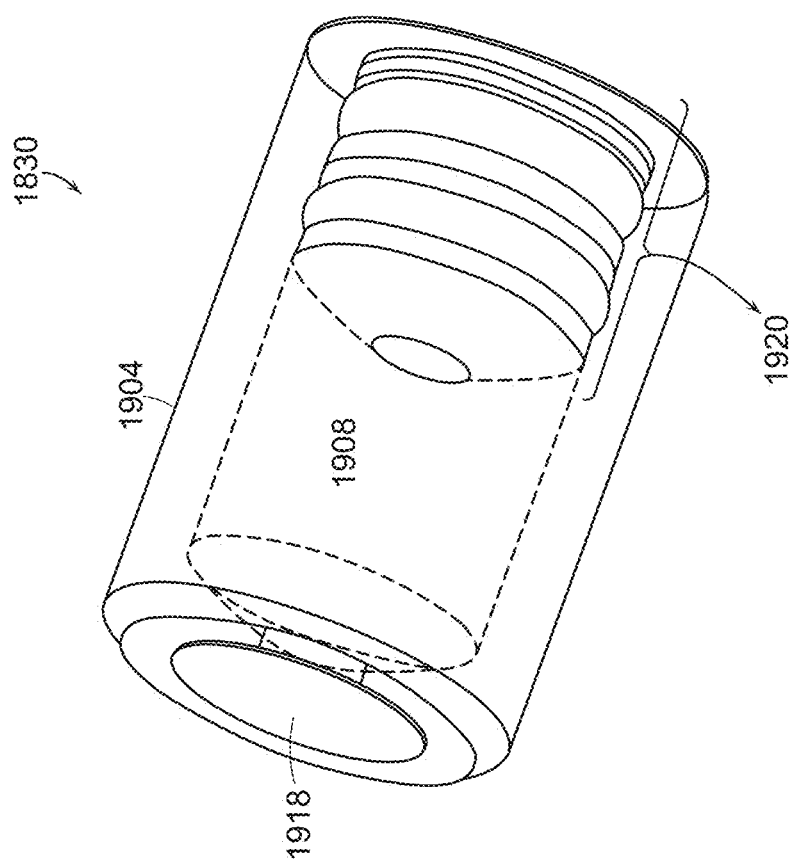
FIG. 19B is a cutaway perspective view of an adhesive module according to an aspect of the present disclosure.

The first opening 1912 has a first diameter smaller than a second diameter of the second opening 1916. The second opening 1916 is configured to receive a plunger assembly 1920 as shown in FIG. 19B.

Figure 20:
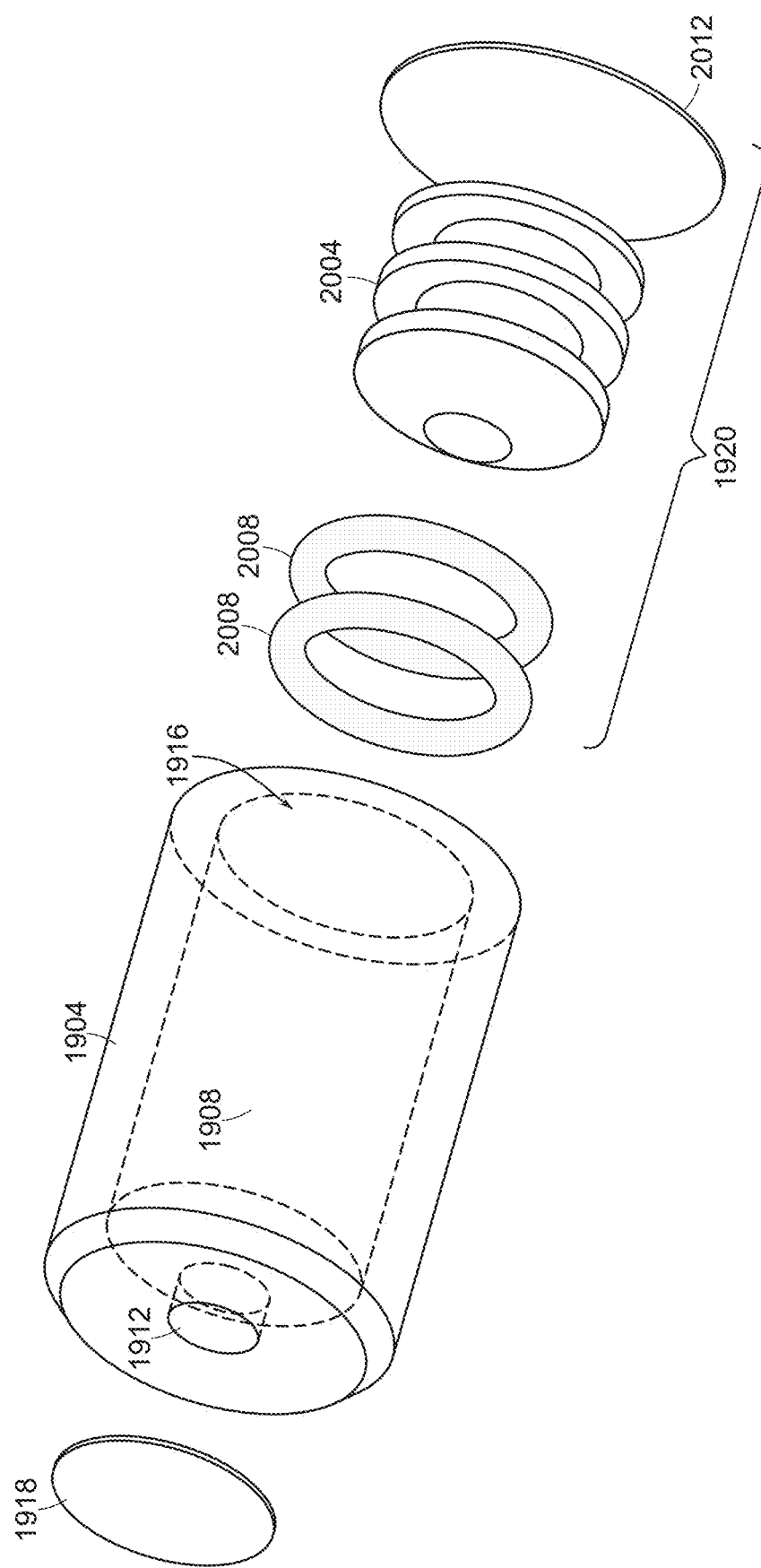
FIG. 20 is an exploded perspective view of an adhesive module according to an aspect of the present disclosure.

Referring now to FIG. 20, the plunger assembly 1920 includes a plunger core 2004 around which two O-rings 2008 are provided. A second blister membrane 2012 is provided to seal the adhesive module 1830.

Accordingly, in operation, the reservoir 1908 is filled with the desired adhesive material and the plunger assembly 1920 is put in place in the housing 1904. The first and second blister membranes 1918, 2012 maintain a seal on the adhesive module 1830. If a UV-curable epoxy is provided in the reservoir 1908, then the housing 1904 and the membranes 1918, 2012 would be made of a UV-light impermeable material.

Prior to the puck 1800 being placed on a surface, the adhesive module 1830 is placed in the channel 1812 and the puck 1800, in one aspect of the present disclosure, is placed in the fixture attaching system 100.

When the trigger 107 is pulled, the plunger actuator 210 will rupture the second blister membrane 2012 and urge the plunger assembly 1920 toward the first opening 1912. The pressure of the adhesive being pushed by the plunger assembly 1920 will then rupture the first blister membrane 1928 and the adhesive will be passed into the space between the puck 1900 and the surface on which it is placed. Placement of the puck 1900, including any necessary curing operations on the adhesive, will then proceed as set forth herein.

Advantageously, the adhesive module 1830 allows for flexibility in choosing an adhesive for a particular surface or environment. Further, a puck may be stored "unloaded," that is, without an adhesive, until shortly before it is to be deployed and, therefore, fresh adhesive may be used by inserting a new module 1830.

A method 2100 of placing a hard-point fixture on a target surface, in accordance with another aspect of the present disclosure, is set forth in FIG. 21. Initially, a hard-point fixture is provided, step 2102. The hard-point fixture may be any of the ones described above and, therefore, may be provided in the handle or the all-in-one version. An adhesive is provided in a channel of the hard-point fixture, step 2104, and the hard-point fixture is placed on the target surface to define an enclosed space between the hard-point fixture and the target surface, step 2106. A plunger is operated and a portion of the adhesive is extruded from the channel into the enclosed space, step 2108. Again, the plunger may be operated by operation of the fixture attaching system 100 or by an operator implementing the all-in-one version. Subsequently, step 2110, the extruded adhesive in the enclosed space is cured by exposing the extruded adhesive to irradiating energy, as per any one of the aspects of the disclosure described above.

As above, placing the hard-point fixture on the target surface, step 2106, may include adjusting the placement by temporarily affixing the hard-point fixture at a first location on the target surface, then removing the hard-point fixture from the first location on the target surface and then affixing the hard-point fixture at a second location on the target surface. More specifically, this temporary affixation is sufficient to hold the puck in place, for example, on a vertical surface. The adjustment as to the final position of the hard-point fixture is facilitated when the fixture is provided with the magnet, pressure sensitive adhesive or suction cups, described above.

Curing the extruded adhesive in step 2110 may include passing the irradiating energy through a body portion of the hard-point fixture.

Further, curing the extruded adhesive may include exposing the extruded adhesive to the irradiating energy for a predetermined period of time.

During the curing, step 2110, an amount of irradiating energy to which the extruded adhesive has been exposed may be measured and the irradiating is stopped when the measured amount of irradiating energy has reached a predetermined level.

A modified version of the aspects of the disclosure discussed above with respect to FIGS. 1A-9 will now be described. Thus, rather than a puck with the twist lock features 308 and the applicator section 201 with the twist lock rim 214 to receive the keyed puck, a puck is provided without a twist lock feature 308 and the applicator section 201 is sized to cover the non-keyed puck.

Accordingly, the puck may be provided with the temporary attachment mechanism 1420 and manually placed, and repositioned if necessary, by the user on the target surface. Once in the desired position, the fixture attaching system 100 may be placed over the puck and the adhesive cured, as described herein.

Further, in another aspect of the present disclosure, a re-positionable wax "adhesive" may be used in the channel of the foregoing pucks. Still further, a hydrogel "epoxy," i.e., an adhesive that degrades after water in the hydrogel evaporates, may be used to apply a hard-point fixture that is meant to eventually fall off. In addition, while one exemplary aspect used UV-curable epoxy, other light-curable epoxies, for example, an infrared (IR) curable epoxy, may be used. In the case of a IR-curable epoxy, the irradiating device would provide light or energy in the infrared spectrum.

In addition, any puck disclosed herein may be configured to attach different form factor hard-points, for example, to place hand and foot holds by a lead climber to then allow other climbers to ascend more easily.

Alternatively, any puck disclosed herein may be provided with various sensors and silently attached to any smooth target surface, for example, the exterior of a building, aircraft, vehicle, etc.

Advantageously, aspects of the present disclosure accommodate a relatively large surface area on the puck for epoxy connection while being housed, in one aspect, in a self-powered (battery), handheld and portable unit. This compares favorably to known UV curing systems that require either a large power source, e.g., industrial curing during assembly, or only affect a small area, e.g., dental instruments for dental applications.

Further, aspects of the present disclosure provide for placement of the fixture and epoxy curing that uses fewer parts while being faster, smaller and lighter than known systems.

Still further, the attachment process is quieter over a wider variety of attachment target surfaces and results in a low visibility post attachment.

The fixture attaching system can be implemented to attach a fixture to any target surface to which a strong epoxy-based connection can be made. The present disclosure is not limited to a vertical target surface.

The present disclosure is illustratively described herein in reference to the disclosed implementations. Various modifications and changes may be made to the disclosed implementations by persons skilled in the art without departing from the scope of the present disclosure as defined in the appended claims.

What is claimed is:

1. An apparatus for placing a hard-point fixture on a target surface, the apparatus comprising:
   a handle;
   an applicator portion, coupled to the handle, defining a receiver portion configured to releasably couple to a hard-point fixture;
   an irradiating device, located in the applicator portion, configured to direct irradiating energy into the receiver portion;
   a trigger disposed in the handle;
   an actuator, coupled to the trigger, and positioned in the handle to extend into the receiver portion in response to movement of the trigger;
   a controller, coupled to the irradiating device, configured to control the irradiating device; and
   a detector, disposed in the applicator portion and coupled to the controller, configured to detect the irradiating energy output from the irradiating device,
   wherein the controller is further configured to apply power to the irradiating device for a first period of time as a function of the detected irradiating energy.

2. The apparatus of claim 1, further comprising:
   a hard-point fixture disposed in the applicator portion, the hard-point fixture comprising a body and a body channel, defined in the body, configured to receive the actuator.

3. The apparatus of claim 2, wherein the applicator portion is keyed to receive the hard-point fixture in a first orientation.

4. The apparatus of claim 2, wherein the hard-point fixture body further comprises:
   opposing first and second surfaces;
   the body channel provided in the body having a first opening defined in the first surface of the body and a second opening defined in the second surface of the body;
   a lip structure disposed on the body first surface to define an adhesion surface adjacent to, and surrounding, the body channel first opening; and
   a movable plunger disposed in the body channel and configured to move from a first position to a second position,
   wherein the actuator is oriented in the receiver portion to extend into the body channel to contact the movable plunger.

5. The apparatus of claim 4, wherein a portion of the hard-point fixture body comprises a material that permits irradiating energy to pass through.

6. The apparatus of claim 4, wherein a portion of the body surrounding the channel comprises a material that blocks irradiating energy from passing into the channel.

7. The apparatus of claim 4, further comprising:
   adhesive material disposed in the hard-point fixture channel and located between the channel first opening and the plunger.

8. The apparatus of claim 7, wherein the adhesive material is one of:
   a UV-curable epoxy;
   an IR-curable epoxy;
   a two component epoxy;

a degradable adhesive; or
a heat-curable epoxy.

9. The apparatus of claim 4, wherein the hard-point fixture further comprises:
an adhesive module disposed in the body channel, comprising:
a module reservoir defined therein; and
a first module opening fluidly coupled to the module reservoir and aligned with the body channel first opening, wherein the plunger is positioned in the module reservoir.

10. The apparatus of claim 9, wherein the adhesive module further comprises:
adhesive material disposed in the module reservoir between the plunger and the first module opening.

11. The apparatus of claim 10, wherein the adhesive material is one of:
a UV-curable epoxy;
an IR-curable epoxy;
a two component epoxy;
a degradable adhesive; or
a heat-curable epoxy.

12. The apparatus of claim 1, further comprising:
a switch coupled to the controller,
wherein the controller is further configured to energize the irradiating device when the switch has been detected as being activated.

13. The apparatus of claim 12, wherein the controller is further configured to delay energizing the irradiating device a predetermined delay time after the switch has been activated.

14. The apparatus of claim 1, wherein the irradiating device is configured to provide at least one of:
light in the ultraviolet spectrum;
heat; or
light in the infrared spectrum.

15. The apparatus of claim 1, wherein the controller is further configured to:
energize the irradiating device for a predetermined period of time.

16. The apparatus of claim 1, further comprising:
a power module, coupled to the irradiating device and the controller, configured to power the irradiating device,
wherein the controller is configured to cause power to be applied to the irradiating device by the power module.

17. An apparatus for placing a hard-point fixture on a target surface, the apparatus comprising:
a handle;
an applicator portion, coupled to the handle, defining a receiver portion configured to releasably couple to a hard-point fixture;
an irradiating device, located in the applicator portion, configured to direct irradiating energy into the receiver portion;
a trigger disposed in the handle;
an actuator, coupled to the trigger, and positioned in the handle to extend into the receiver portion in response to movement of the trigger;
a controller, coupled to the irradiating device, configured to control the irradiating device; and
a hard-point fixture disposed in the applicator portion, the hard-point fixture comprising a body and a body channel, defined in the body, configured to receive the actuator.

18. The apparatus of claim 17, wherein the hard-point fixture body further comprises:
opposing first and second surfaces;
the body channel provided in the body having a first opening defined in the first surface of the body and a second opening defined in the second surface of the body;
a lip structure disposed on the body first surface to define an adhesion surface adjacent to, and surrounding, the body channel first opening; and
a movable plunger disposed in the body channel and configured to move from a first position to a second position,
wherein the actuator is oriented in the receiver portion to extend into the body channel to contact the movable plunger.

19. The apparatus of claim 18, wherein the hard-point fixture further comprises:
an adhesive module disposed in the body channel, comprising:
a module reservoir defined therein; and
a first module opening fluidly coupled to the module reservoir and aligned with the body channel first opening, wherein the plunger is positioned in the module reservoir.

20. The apparatus of claim 19, wherein the adhesive module further comprises:
adhesive material disposed in the module reservoir between the plunger and the first module opening,
wherein the adhesive material is one of:
a UV-curable epoxy;
an IR-curable epoxy;
a two component epoxy;
a degradable adhesive; or
a heat-curable epoxy.

21. The apparatus of claim 18, wherein at least one of:
a portion of the hard-point fixture body comprises a material that permits irradiating energy to pass through; or
a portion of the body surrounding the channel comprises a material that blocks irradiating energy from passing into the channel.

22. The apparatus of claim 18, further comprising:
adhesive material disposed in the hard-point fixture channel and located between the channel first opening and the plunger,
wherein the adhesive material is one of:
a UV-curable epoxy;
an IR-curable epoxy;
a two component epoxy;
a degradable adhesive; or
a heat-curable epoxy.

* * * * *